United States Patent
Quast

(10) Patent No.: US 9,392,781 B2
(45) Date of Patent: Jul. 19, 2016

(54) LIVE BAIT HEATER AND AERATOR

(71) Applicant: Scott Elmer Quast, Litchfield, MN (US)

(72) Inventor: Scott Elmer Quast, Litchfield, MN (US)

( * ) Notice: Subject to any disclaimer, the term of this patent is extended or adjusted under 35 U.S.C. 154(b) by 160 days.

(21) Appl. No.: 14/516,100

(22) Filed: Oct. 16, 2014

(65) Prior Publication Data

US 2015/0101238 A1   Apr. 16, 2015

Related U.S. Application Data

(60) Provisional application No. 61/891,486, filed on Oct. 16, 2013.

(51) Int. Cl.
| | |
|---|---|
| *A01K 97/05* | (2006.01) |
| *A01K 63/04* | (2006.01) |
| *A01K 63/06* | (2006.01) |
| *A01K 63/02* | (2006.01) |

(52) U.S. Cl.
CPC ............... *A01K 97/05* (2013.01); *A01K 63/042* (2013.01); *A01K 63/065* (2013.01); *A01K 63/02* (2013.01)

(58) Field of Classification Search
CPC ..... A01K 97/05; A01K 63/042; A01K 63/02; A01K 63/045
USPC .......................................................... 43/57
See application file for complete search history.

(56) References Cited

U.S. PATENT DOCUMENTS

| | | | | |
|---|---|---|---|---|
| 2,510,427 A | * | 6/1950 | Soucie ................. | A01K 63/042 210/167.26 |
| 3,320,928 A | * | 5/1967 | Smith ................. | A01K 63/042 119/200 |
| 4,168,590 A | * | 9/1979 | Beshoner, Sr. ......... | A01K 63/02 43/55 |
| 4,945,672 A | * | 8/1990 | Raia ....................... | A01K 97/05 261/121.2 |
| 5,172,511 A | * | 12/1992 | Smith ..................... | A01K 97/05 261/121.2 |
| 5,632,220 A | * | 5/1997 | Vento .................... | A01K 63/042 114/255 |
| 5,802,760 A | * | 9/1998 | Campbell .............. | A01K 97/06 206/315.11 |
| 6,038,993 A | * | 3/2000 | Vento ..................... | A01K 97/05 114/255 |
| 7,611,130 B2 | * | 11/2009 | Sylvester ............. | A01K 63/042 119/201 |
| 8,002,245 B2 | * | 8/2011 | Sylvester ............. | A01K 63/042 119/201 |
| 2008/0028667 A1 | * | 2/2008 | Grzybowski ........... | A01K 63/02 43/57 |
| 2012/0085019 A1 | * | 4/2012 | Link ...................... | A01K 97/01 43/55 |
| 2015/0101238 A1 | * | 4/2015 | Quast ................... | A01K 63/042 43/57 |

* cited by examiner

*Primary Examiner* — Shin Kim

(57) ABSTRACT

An apparatus with a submersed unit, an air pump, a switching-mode power supply, a power transmission cable, a multi-position selector switch, and an air hose is used to aerate and also heat a quantity of water that holds live bait used for fishing. The switching-mode power supply and the air pump are enclosed within a head unit housing which is plugged into a power source. The water containing the live bait is aerated through an aeration stone connected to the air pump through the air hose. When the water needs to be heated a temperature sensitive heating element heats the water. The supplied conditions are controlled by the multi-position selector switch. The temperature sensitive heating element is powered through the power transmission cable and contains a thermistor and a resistive wire. More specifically, when the thermistor detects a drop in temperature, the resistive wire converts electricity into heat.

18 Claims, 20 Drawing Sheets ern art, and requires only the most basic of mechanical
LIVE BAIT HEATER AND AERATOR The current application claims a priority to the U.S. Provisional Patent application Ser. No. 61/891,486 filed on Oct. 16, 2013.

FIELD OF THE INVENTION

The present invention relates generally to fishing with live bait. More specifically, the present invention is a live bait heater and aerator that can operate in very low temperature conditions. The present invention works to regulate both the water temperature and the oxygen levels within a container storing live bait.

BACKGROUND OF THE INVENTION

Fishing is a favored hobby of those who live near lakes, streams, rivers, and other bodies of water which are capable of harboring populations of marine animals. There are two primary reasons for why a person may wish to take part in fishing with the first reason being for recreations, and the second reason being for food. Many people consider fishing to be an extremely relaxing activity, no doubt partially due to the relaxed nature of the task, and the natural surroundings in which the activity of fishing often places the fisherman. Fishing often takes place on the bank of a river or lake, on a pier, in a stream or river, or on a boat. Most of these locations are typically considered to be very calm and serene, or at the very least, highly enjoyable to the senses. The fisherman is usually able to feel a reconnection with nature by way of the activity of fishing and the locations where it is performed. Fishing allows people to take a step back from the modernized world and relax in nature by performing an activity that is an ancient human art, and requires only the most basic of mechanical technology in order to perform; thus driving its popularity in an increasingly hectic modern lifestyle. This fact is the main reason why fishing is often performed by individuals as a favored pastime, and fishing for this purpose is often referred to as recreational fishing; it is however, not the only reason to fish.

The other primary reason to perform the task of fishing is to gather food for human consumption. The food gathered by fishing is either consumed by the individual who is fishing or is put up for sale at market. Fishing which is performed for the sole purpose of gathering large amounts of fish is typically referred to as commercial fishing, and any fish which are caught are typically sold on the market and are subsequently distributed to grocery stores, restaurants, and industrial food processing plants. Most commercial fishing is typically performed using large commercial fishing boats which make use of expansive nets in a technique known as trawling. Trawling is capable of capturing incredible volumes of fish, thereby driving its widespread use within the commercial fishing industry. Fish are an excellent source of the proteins vital to human life, and as a result, commercial fishing provides a very large percentage of protein required by the global human population. Fishing for food is not always performed on a commercial scale. In many parts of the world fishing is still performed on a subsistence level, and is referred to as artisanal fishing.

Despite the widespread prevalence of commercial and artisanal fishing, recreational fishing is still very common for the reasons discussed above. Recreational fishing typically takes place on a very small scale, usually coming down to an individual person fishing in a particular spot on or along a body of water such as a river, stream, or lake. Although there are many different methods of fishing as mentioned, the most common method of fishing utilized by recreational fisherman is known as angling. The method of fishing known as angling utilizes a fishing rod from which a fishing line is dropped into the water. At the end of the line is located either a lure or a hook with bait, both of which are intended to attract fish and then pierce the fish's mouth when it bites down on the lure or hook. Although there are many different kinds of synthetic lures and baits which are intended to replace traditional live baits, it is generally accepted that live bait has a higher success rate then their synthetic counterparts. Although live bait is generally more effective than synthetic bait, it is also much more difficult to store preceding its use in fishing activities. This is mainly due to the simple fact that the live bait must be kept alive. Additionally, the bait is most effective if it is still alive when it is placed onto the hook and subsequently dropped into the water; it is much more likely to attract bites if it is still alive and moving as opposed to being dead and motionless. Thus, it is important that the bait is fully alive at two critical points in the fishing process; before being applied to the hook, and after being dropped into the water on the end of a fishing line. Accomplishing this can be a particular challenge for those who live and fish in colder environments.

In order to keep live bait alive, it is necessary to prevent the water in which the bait resides from dropping below a certain temperature. This can be difficult, as if the bait is stored outdoors in a cold environment; the water may easily drop too low and kill the bait. On the other hand, if the bait is stored within a temperature controlled environment such as the interior of a house, the bait becomes used to this warmer temperature. When the bait is subsequently dropped into the cold water of a lake or stream, the bait can die instantly from the shock of the sudden temperature change. Thus, it is desirable to keep the water in which the bait is stored at a temperature that is equal or similar to the temperature of large bodies of water in the environment where the fishing takes place. It is clear that there is a need for a device which can regulate water temperature of a small volume of water to allow live bait to be stored outdoors, or in non temperature controlled buildings until such time as the bait is utilized by the fisherman. It is therefore an objective of the present invention to introduce a live bait heater and aerator which provides dual functionality to keep live bait alive until such time as it is used by the fisherman. The present invention provides both aeration and heating functions suitable for use on a small volume of water such as that contained within a bait storing bucket. By regulating the temperature of the water, the user of the present invention can store their bait outdoors, or in a garage without fear of their bait dying and becoming unusable. It is an object of the present invention to automatically regulate the temperature of the water in which it is placed at a level which is similar to the temperature of large bodies of water in the environment. It is a further object of the present invention to be very easy to use, and to be highly durable such that it can survive continued exposure to low temperature conditions in which it is intended to operate.

DETAIL DESCRIPTIONS OF THE INVENTION

All illustrations of the drawings are for the purpose of describing selected versions of the present invention and are not intended to limit the scope of the present invention.

The present invention is a live bait heater and aerator that can be used to protect live bait against temperature changes. When fishing in cold temperatures, the live bait experience drastic temperature changes when dropped into cold water. As a result, the live bait die of shock on most instances. Keeping the bait alive is a key factor in fishing, and this emphasizes the need to maintain a recommended temperature for the live bait. The present invention addresses the issue by maintaining a constant environment temperature in a body of water containing the live bait. In doing so, the present invention not only aerates the body of water that the live bait is stored in, but also has an internal heater that maintains the temperature in the body of water the live bait is stored in. On most occasions, live bait is stored in a small container such as a bucket. Therefore, the present invention is designed such that it can be conveniently used in a bucket or similar container that holds the live bait.

Figure 1:
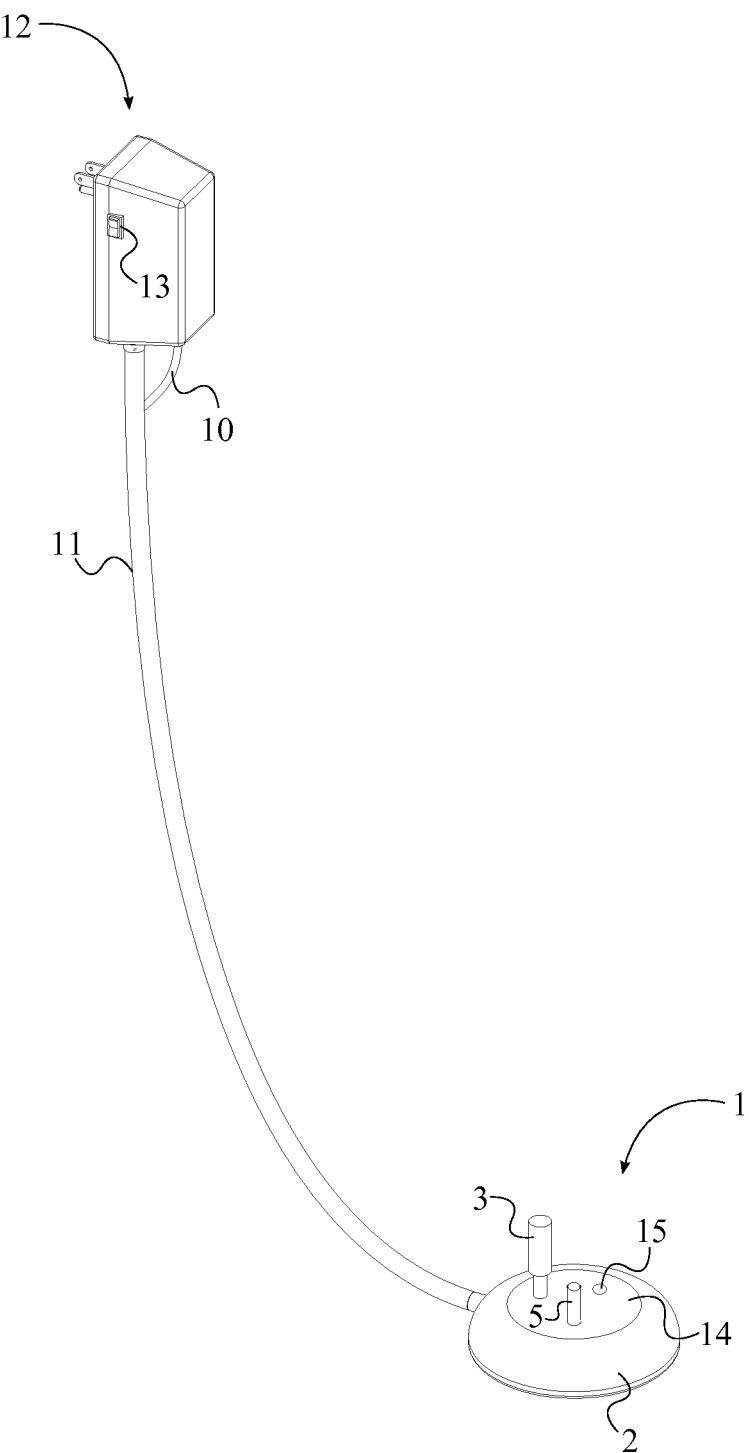
FIG. 1 is a perspective view of the present invention, wherein the present invention is fully assembled.
Figure 2:
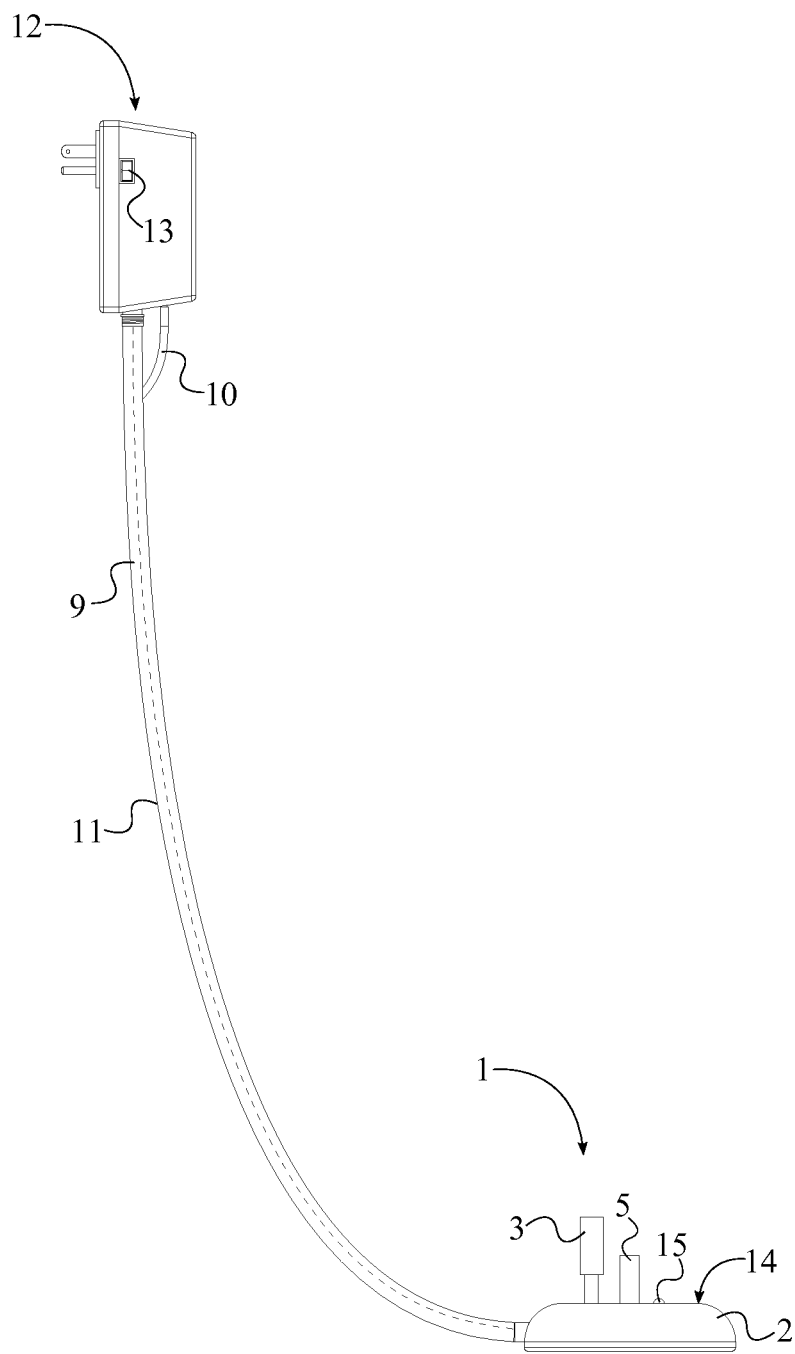
FIG. 2 is a side view of the present invention, wherein the present invention is fully assembled.
Figure 3:
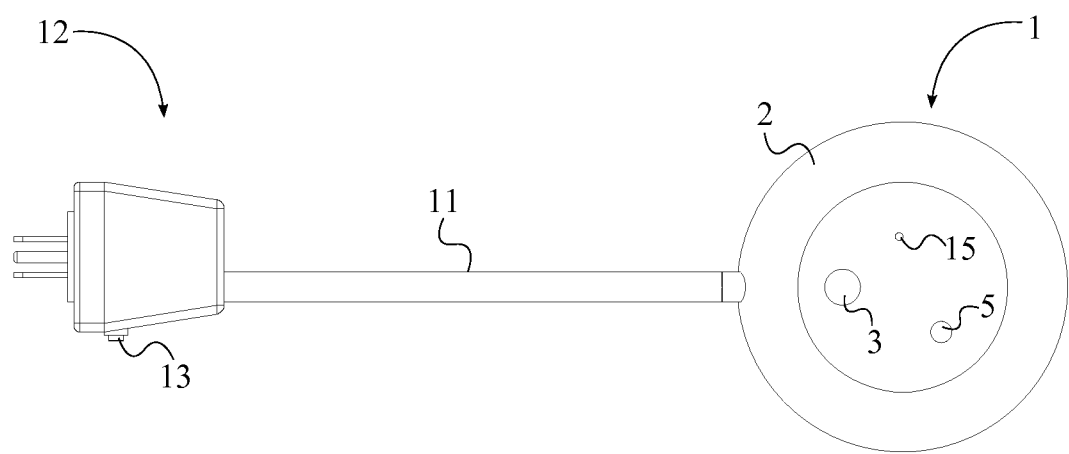
FIG. 3 is a top view of the present invention, wherein the present invention is fully assembled.
Figure 12:
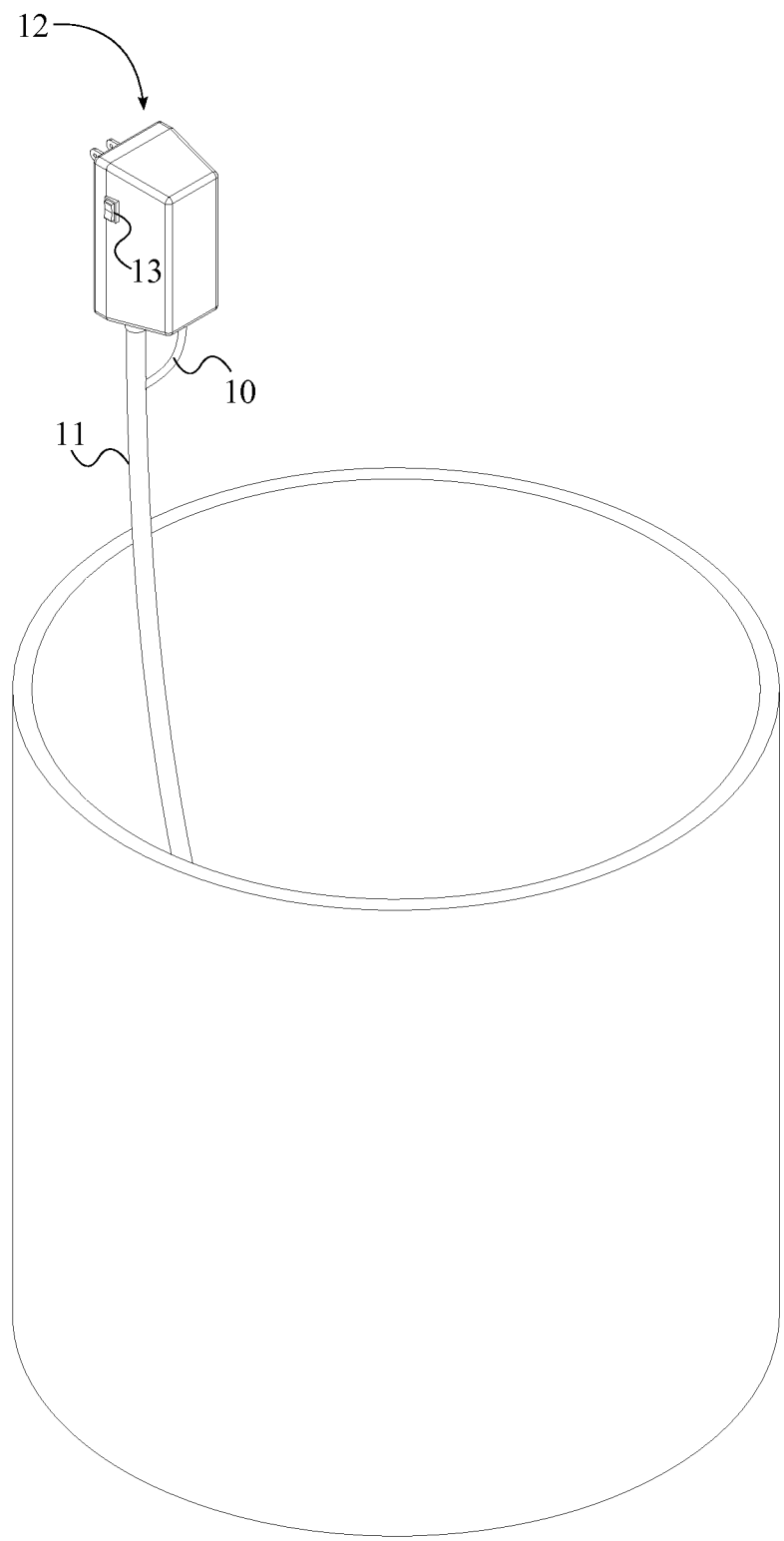
FIG. 12 is a perspective view of the present invention, wherein the present invention is inserted into a bucket.
Figure 13:
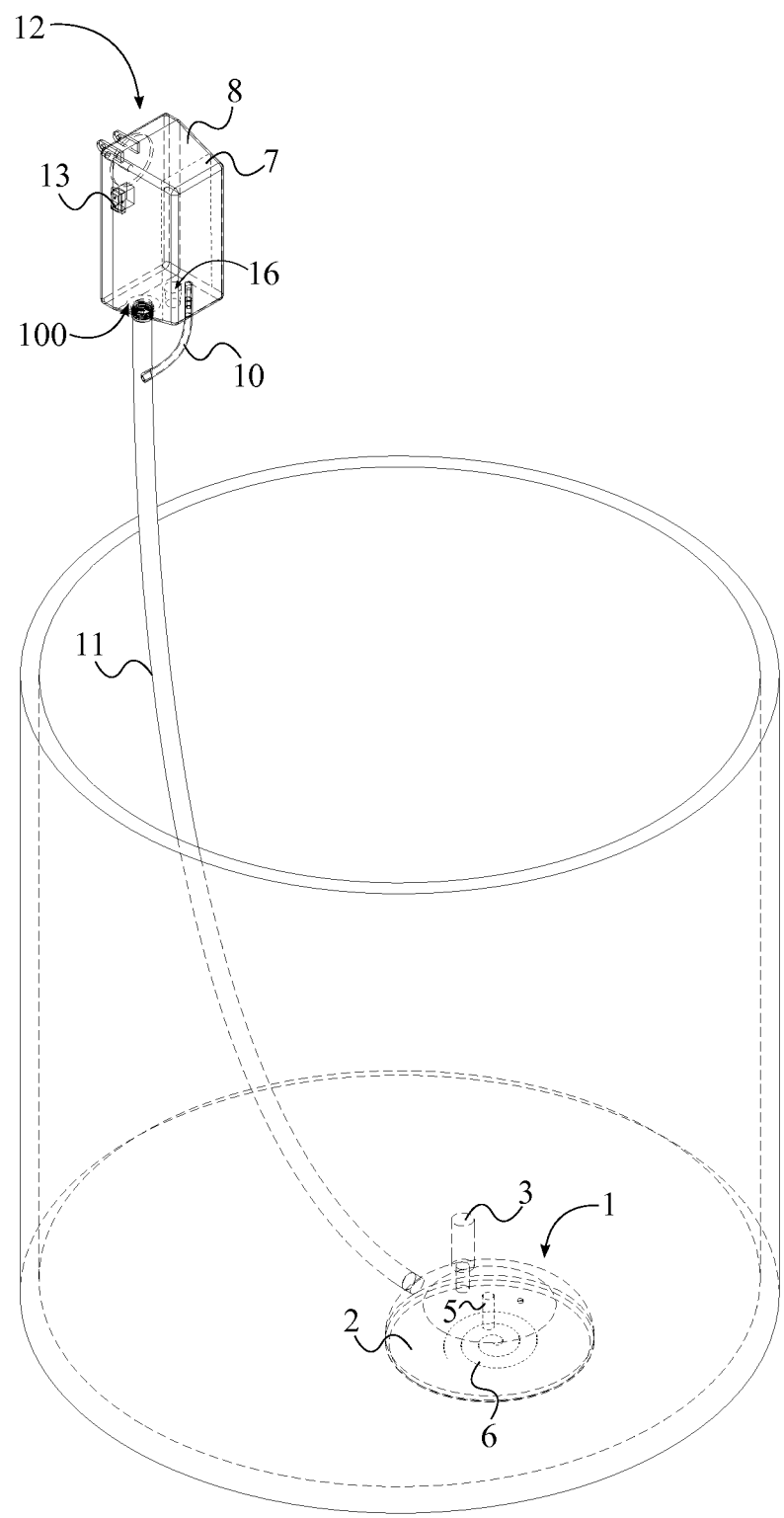
FIG. 13 is another perspective view of the present invention, wherein the present invention is inserted into a bucket.
Figure 14:
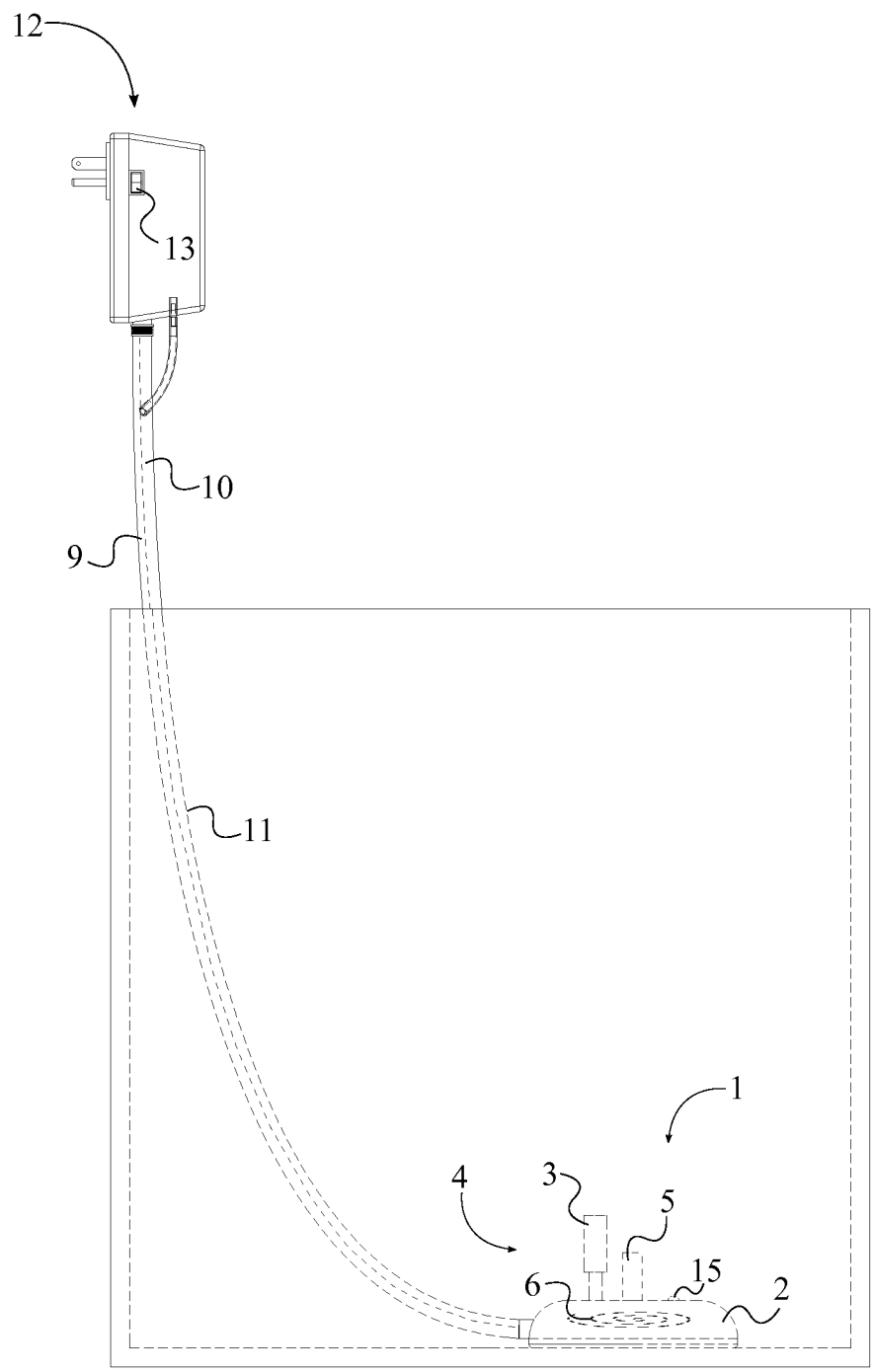
FIG. 14 is a side view of the present invention, wherein the present invention is inserted into a bucket.

As seen in FIG. 1, FIG. 2, and FIG. 13, the present invention comprises a submersed unit 1, an air pump 7, a switching-mode power supply 8, a power transmission cable 9, a multi-position selector switch 13, and an air hose 10. The submersed unit 1 is placed in a container where the live bait is stored in as illustrated in FIGS. 12-14. The submersed unit 1 is designed such that it can be submerged within a liquid for long periods of time. The air pump 7 is connected to the air hose 10 so that the body of water containing the live bait can be aerated through the air pump 7 and the air hose 10. The power transmission cable 9 is utilized to distribute power to the remaining components of the present invention. The multi-position selector switch 13 is utilized to control the conditions that are supplied to the body of water containing the live bait.

Figure 15:
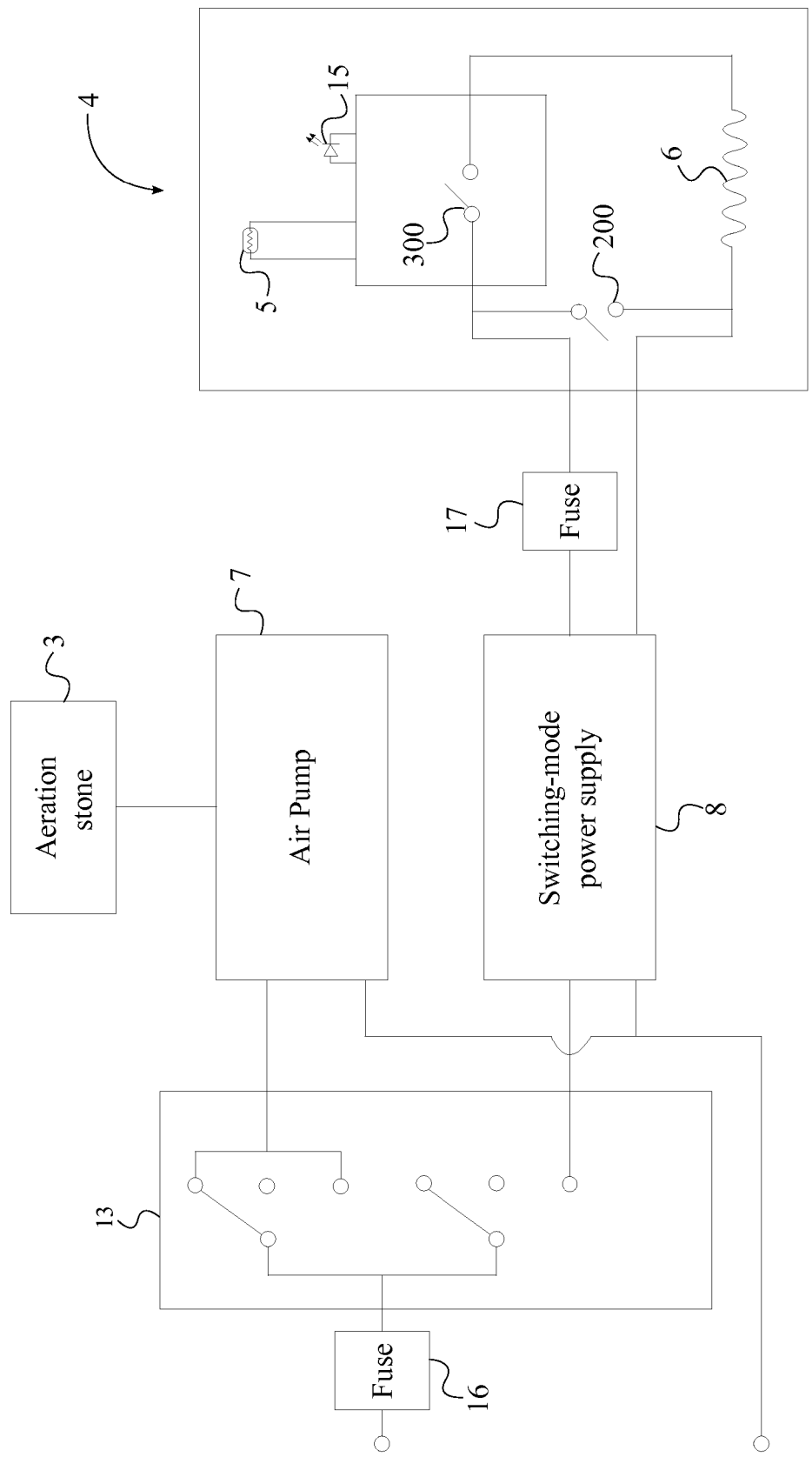
FIG. 15 is an electronic schematic diagram of the present invention, wherein only the aeration stone is activated.
Figure 16:
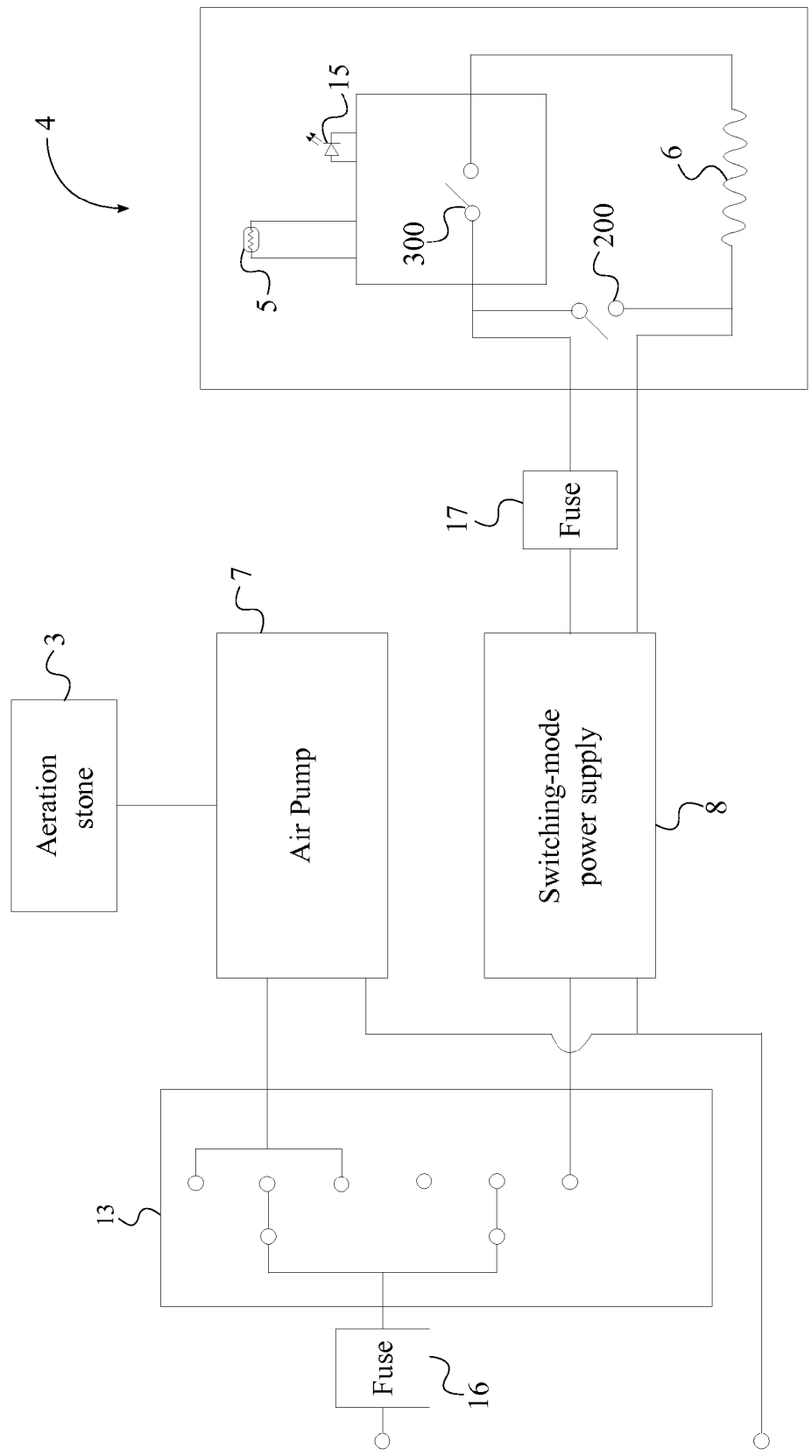
FIG. 16 is an electronic schematic diagram of the present invention, wherein both the aeration stone and the temperature sensitive heating element are switched off.
Figure 17:
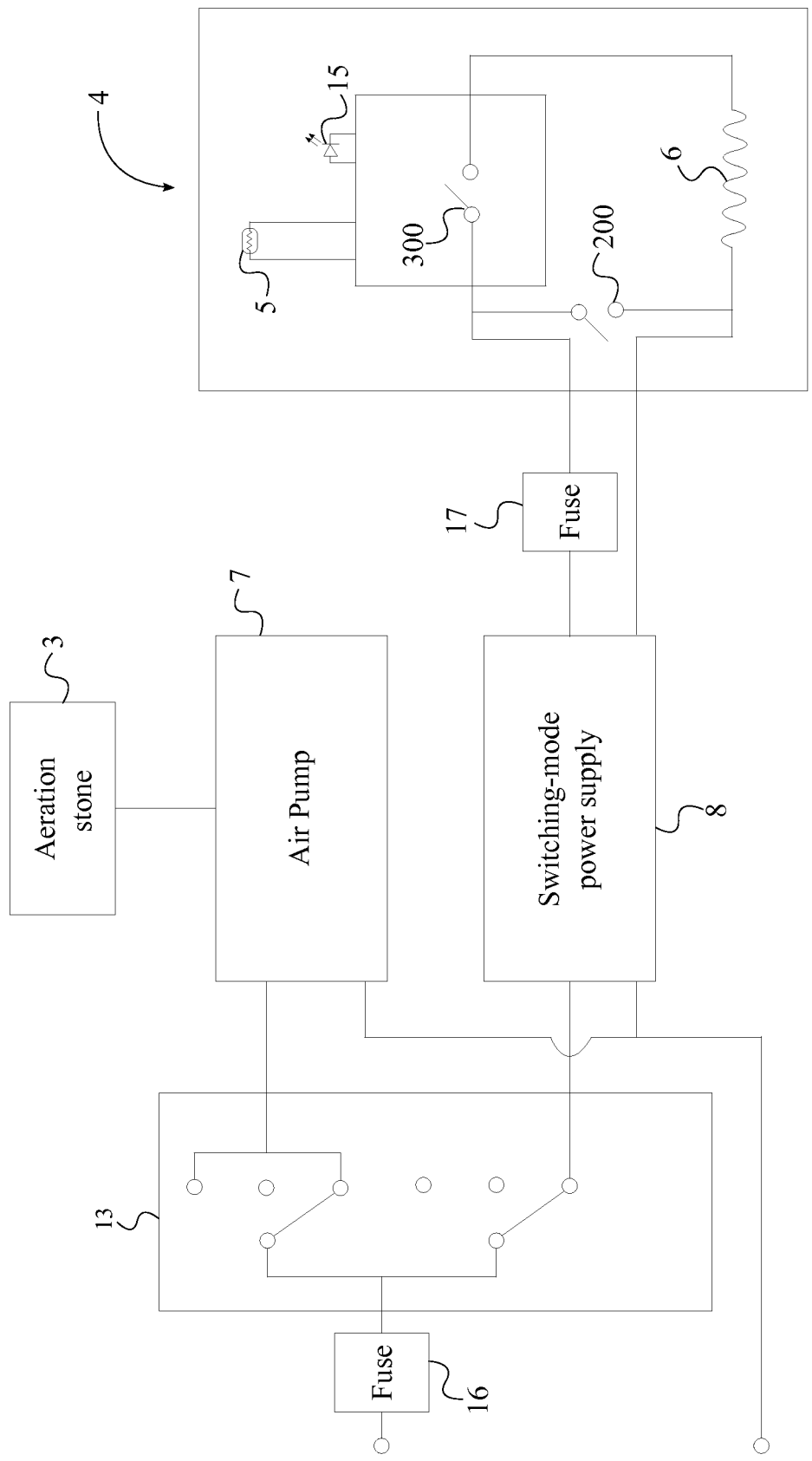
FIG. 17 is an electronic schematic diagram of the present invention, wherein the aeration stone and the temperature sensitive heating element are both activated.

As illustrated in FIG. 1, FIG. 13, and FIG. 14, the submersed unit 1 comprises a structural frame 2, an aeration stone 3, and a temperature sensitive heating element 4. The switching-mode power supply 8 directs power to the temperature sensitive heating element 4 allowing the temperature sensitive heating element 4 to emit heat. In order to do so, the switching-mode power supply 8 is electrically connected in between the multi-position selector switch 13 and the temperature sensitive heating element 4 as seen in FIGS. 15-17. The structural frame 2 is generally cylindrical, and has a certain diameter and a certain height which can vary in another embodiment of the present invention. The structural frame 2 is preferably formed into a puck shape so that the structural frame 2 can conveniently remain submerged for extended time periods. The aeration stone 3 is utilized to complete the aeration process mentioned previously. More specifically, the aeration stone 3 discharges extremely fine bubbles necessary to facilitate oxygen absorption into the water. In order to do so, the air pump 7 needs to be in fluid communication with the aeration stone 3 through the air hose 10. More specifically, the air pump 7 is electrically powered, allowing the aeration stone 3 to aerate the body of water. The size and shape of the aeration stone 3 may vary according to the body of water the present invention is being used in. As an example, a larger body of water requires the aeration stone 3 to be large, while the aeration stone 3 can be small for a small body of water. The temperature sensitive heating element 4 is utilized to maintain the temperature of the body of water that the live bait is stored in. In order to fulfill the heating requirements, the temperature sensitive heating element 4 is electronically connected to the switching-mode power supply 8 through the power transmission cable 9. Both the temperature sensitive heating element 4 and the aeration stone 3 are mounted onto the structural frame 2. Therefore, the structural frame 2 serves as a primary heat transfer contact between the temperature sensitive heating element 4 and the body of water that the live bait is stored in.

The present invention comprises a head unit housing 12 as illustrated in FIGS. 8-11. Both the air pump 7 and the switching-mode power supply 8 are positioned within the head unit housing 12. Therefore, the power transmission cable 9 that connects to the temperature sensitive heating element 4 traverses out of the head unit housing 12. Similarly, the air hose 10 that connects to the aeration stone 3 also traverses out of the head unit housing 12. The head unit housing 12 comprises an air intake hole 100. The air intake hole 100 directs atmospheric air to the air pump 7 which allows the aeration stone 3 to aerate the body of water. Furthermore, the air intake hole 100 traverses through the head unit housing 12 and is preferably positioned around an outlet for the air hose 10. In order to facilitate the air hose 10 and also to direct atmospheric air into the air pump 7 simultaneously, the air intake hole 100 is oversized. More specifically, the radius of the air intake hole 100 is larger than the radius of the air hose 10. However, in an alternative embodiment of the present invention, the air intake hole 100 can be positioned separate from the air hose 10.

Figure 18:
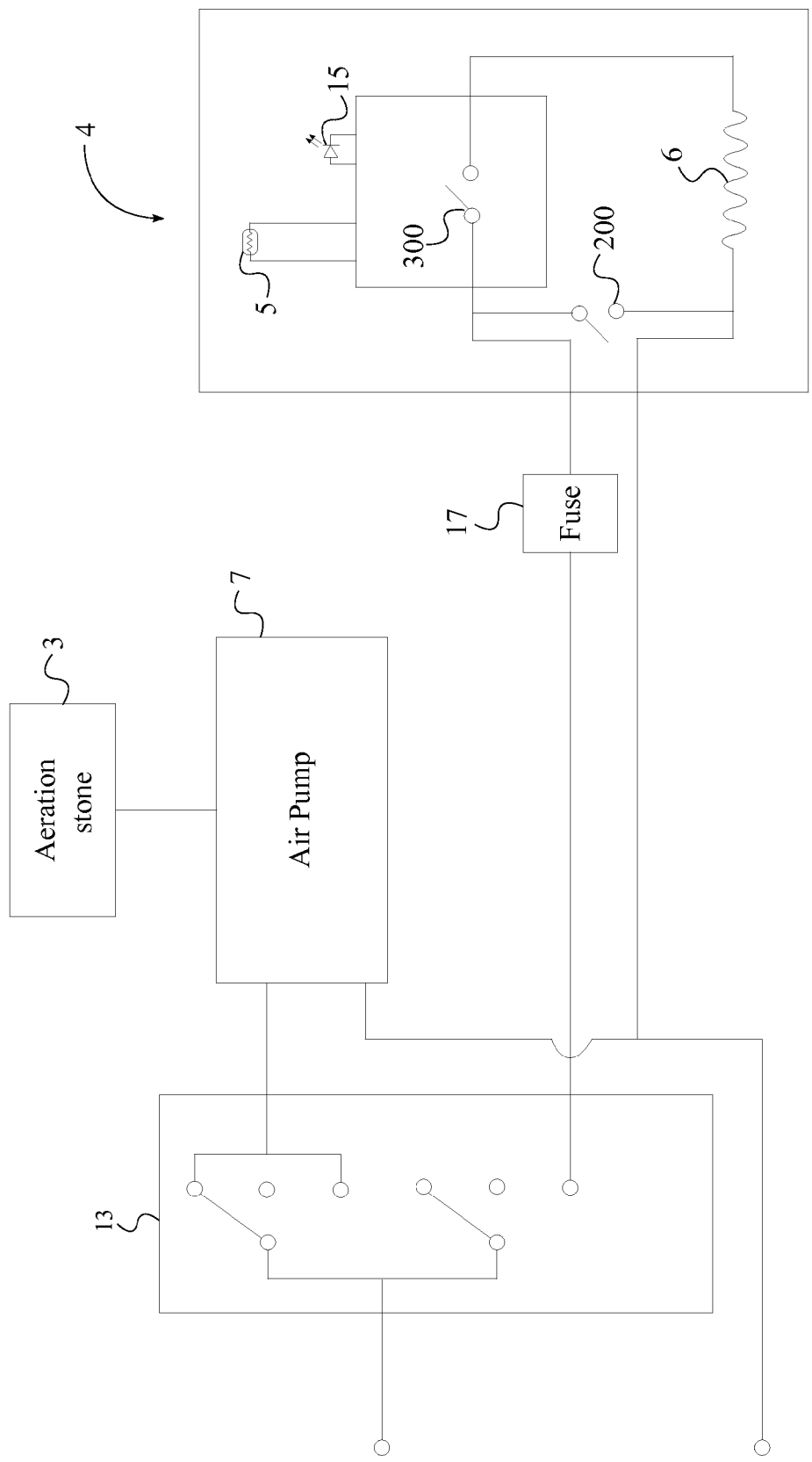
FIG. 18 is an electronic schematic diagram of another embodiment of the present invention, wherein only the aeration stone is activated.
Figure 19:
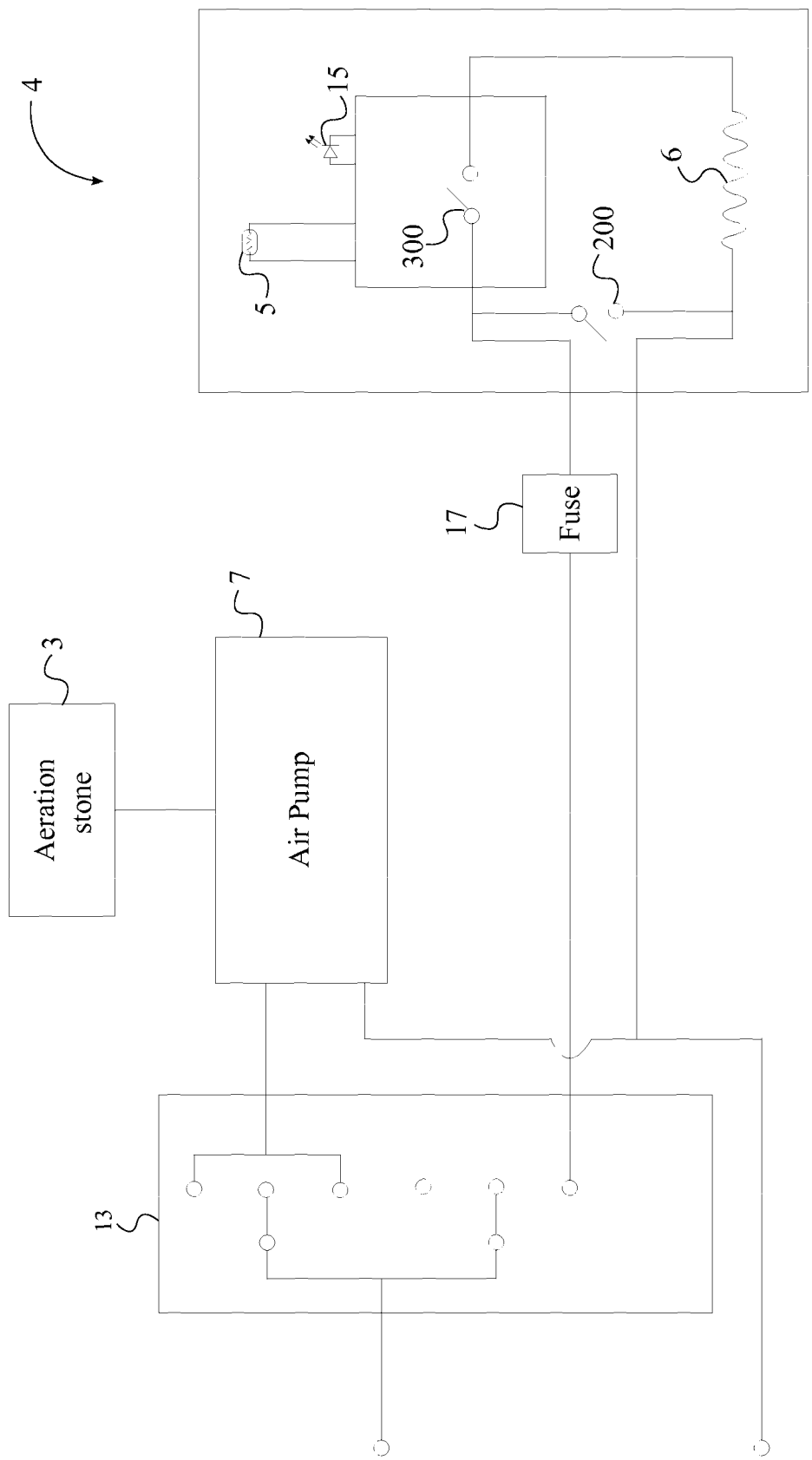
FIG. 19 is an electronic schematic diagram of the other embodiment of the present invention, wherein both the aeration stone and the temperature sensitive heating element are switched off.
Figure 20:
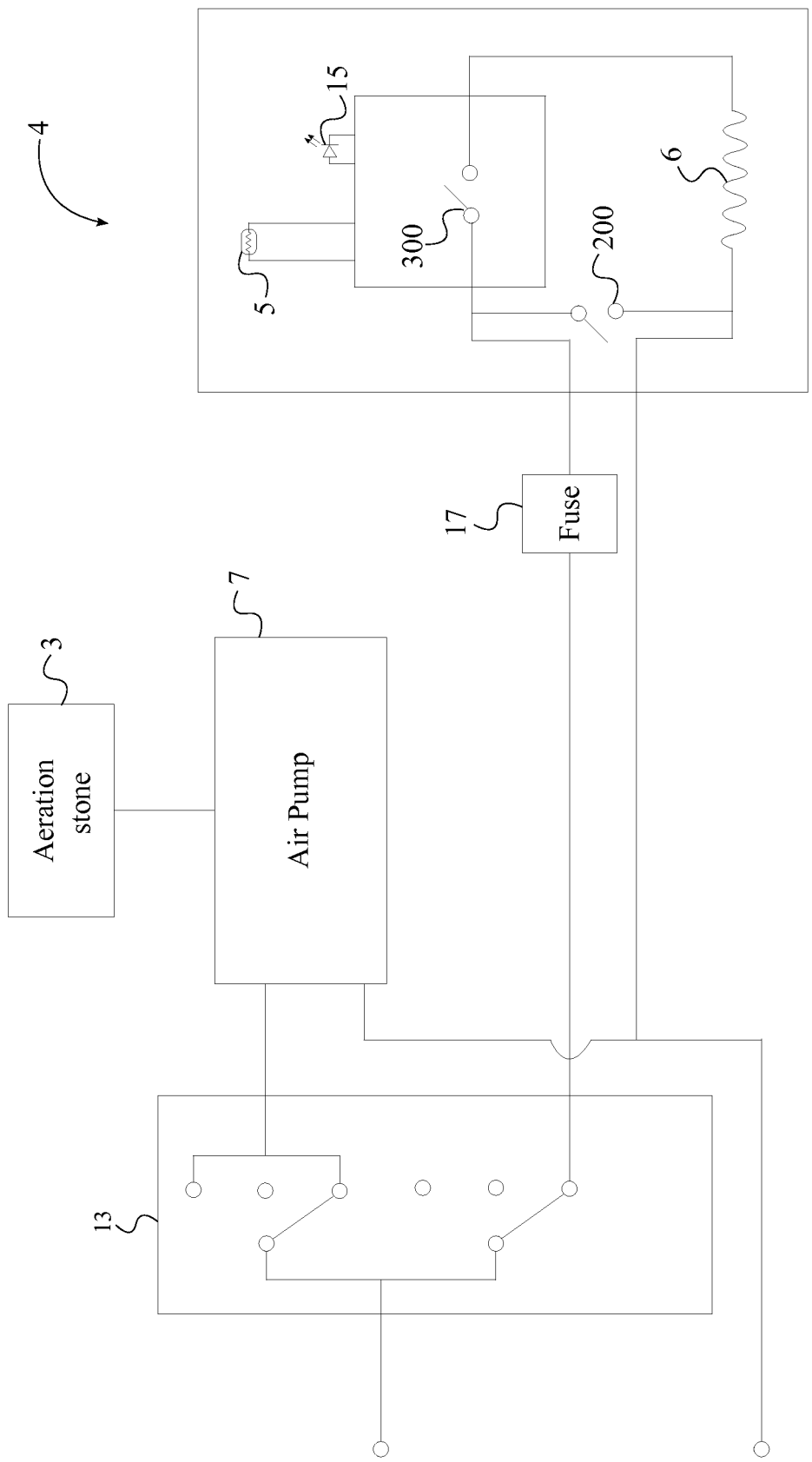
FIG. 20 is an electronic diagram of the other embodiment of the present invention, wherein the aeration stone and the temperature sensitive heating element are both activated.

As seen in FIGS. 8-11, the head unit housing 12 is designed to be plugged into an external power outlet. Then the present invention is powered through an 110V alternating current (AC) power supply. Simultaneously, the switching-mode power supply 8 steps down the 110V AC voltage to a 12V AC voltage in order to power the temperature sensitive heating element 4 as shown in FIGS. 15-17. In contrast, the air pump 7 will be supplied 110V in the preferred embodiment of the present invention since it is directly connected to the multi-position selector switch 13. The electrical connection between the multi-position selector switch 13 and the air pump 7 is also illustrated in FIGS. 15-17. However, in an alternative embodiment of the present invention another comparable voltage can also be utilized. Similar to using an AC voltage, a direct current (DC) power source can also be utilized with the alternative embodiment as illustrated in FIGS. 18-20. In such instances, the switching-mode power supply 8 is omitted, and the temperature sensitive heating element 4 and the air pump 7 are directly powered by the DC power source. For instance, the air pump 7 will also be powered by a 12V DC in comparison to being powered by 110V AC as in the preferred embodiment of the present invention.

As illustrated in FIGS. 15-17, the present invention comprises an overload fuse 16. The overload fuse 16 is utilized as a sacrificial device for instances where a voltage overload and a current overload occurs within the present invention. The overload fuse 16 is electrically connected to the multi-position selector switch 13 as seen in FIGS. 15-17. Additionally, the present invention utilizes a short circuit fuse 17 within the present invention. When the temperature rises beyond an operational temperature, a short circuit occurs such that the short circuit fuse 17 is utilized as a sacrificial device. The operational temperature is the maximum temperature which keeps the bait alive. A rise in temperature beyond the operational temperature is considered harmful for the live bait. The short circuit fuse 17 is connected in series in between the multi-position selector switch 13 and the temperature sensitive heating element 4 as shown in FIGS. 15-20. As a result, if a short circuit occurs within the present invention, the short circuit fuse 17 stops the current from reaching the remaining components of the present invention.

Figure 9:
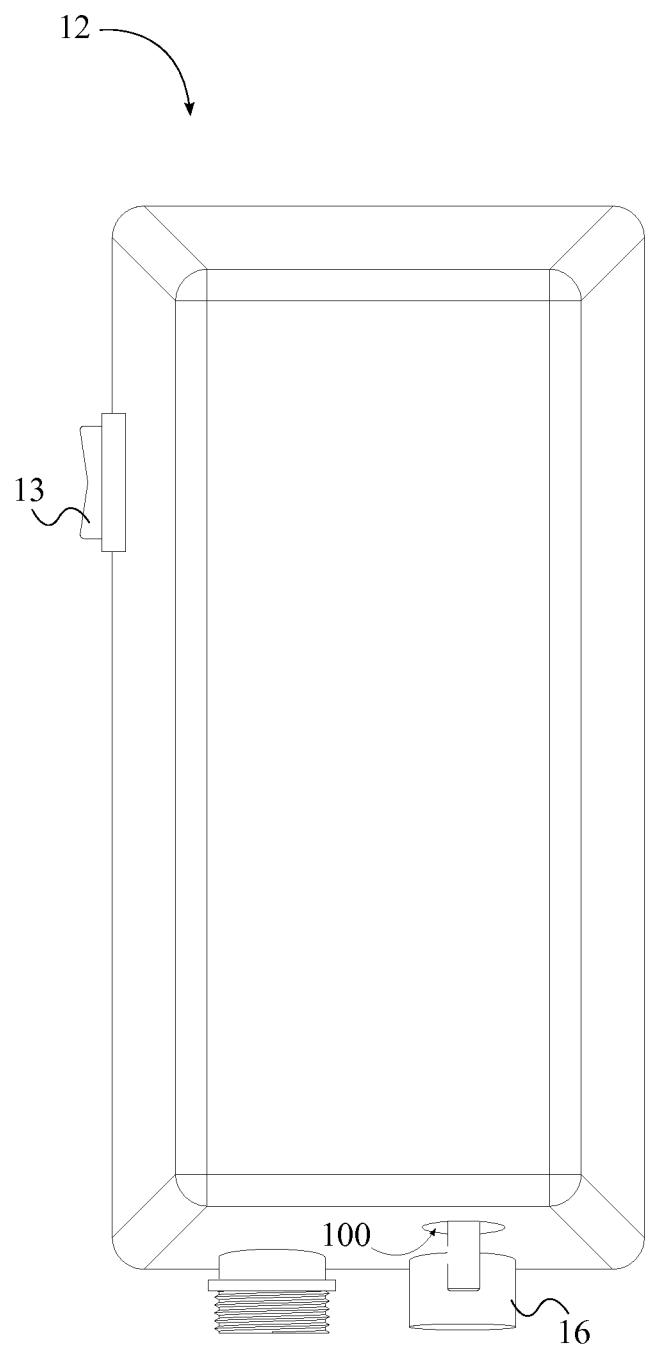
FIG. 9 is a front view of the head unit housing of the present invention.
Figure 10:
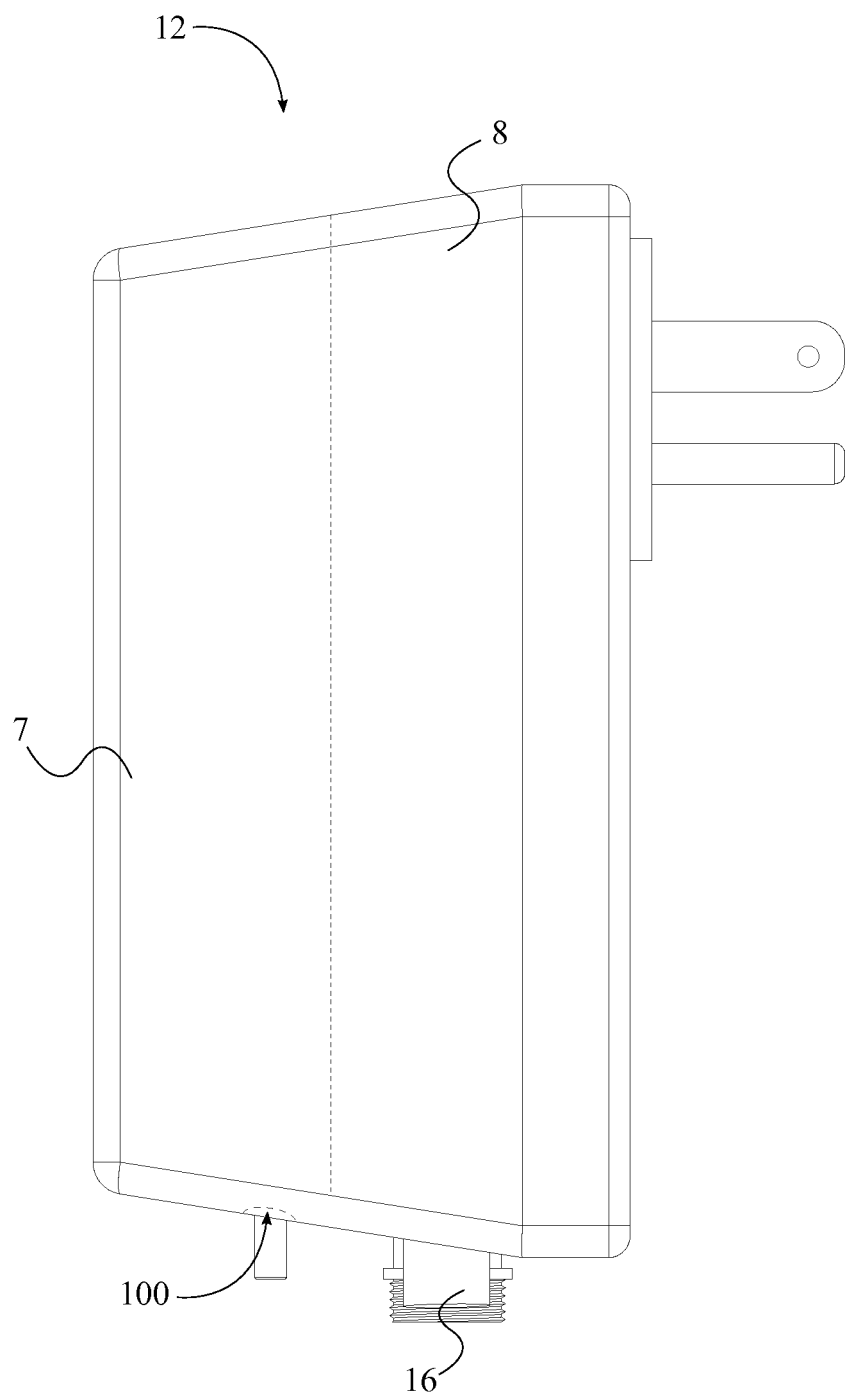
FIG. 10 is a side view of the head unit housing of the present invention.
Figure 11:
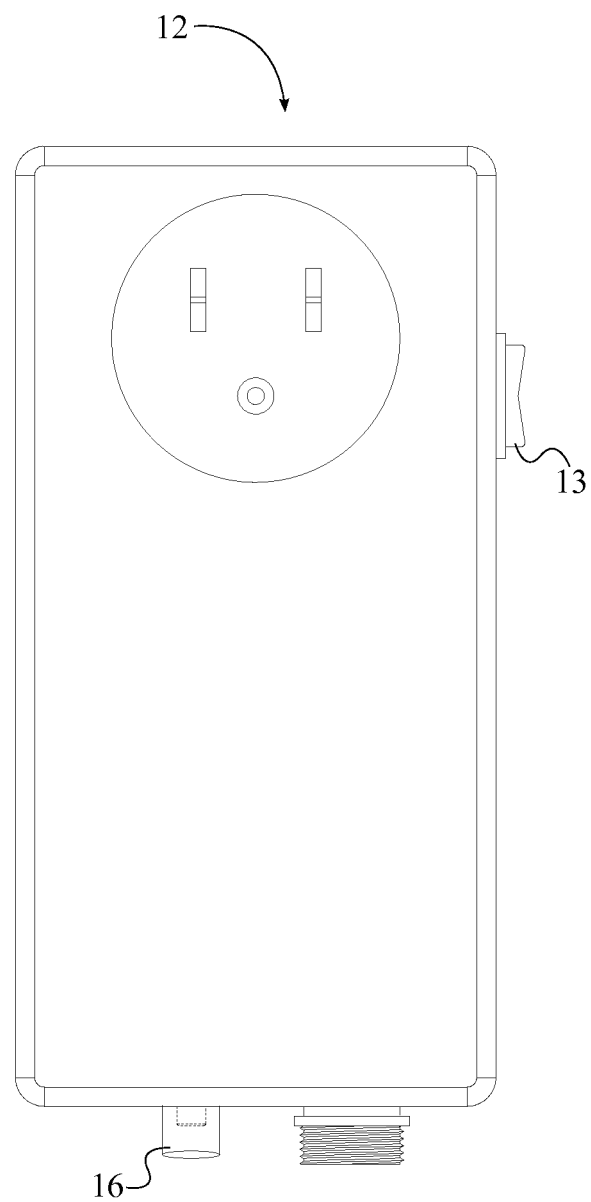
FIG. 11 is a rear view of the head unit housing of the present invention.

In the preferred embodiment of the present invention, the multi-position selector switch 13 is located on the head unit housing 12 as illustrated in FIG. 9. However, the multi-position selector switch 13 can also be located in a different location in alternative embodiments of the present invention. The multi-position selector switch 13 is electrically connected to the switching-mode power supply 8 and the air pump 7. As a result, the user can control the aeration process occurring through the aeration stone 3 which is initiated by the air pump 7. More specifically, the multi-position selector switch 13 can control the power flow to the air pump 7. Since the multi-position selector switch 13 is electrically connected to the switching-mode power supply 8, it is also electrically connected to the temperature sensitive heating element 4. As a result, the multi-position selector switch 13 has the ability to control the power flow to the temperature sensitive heating element 4 as well. More specifically, the multi-position selector switch 13 allows the user to control the heat emitted from the temperature sensitive heating element 4.

In the preferred embodiment of the present invention, the multi-position selector switch 13 has three positions as illustrated in FIGS. 15-17. The first position shuts off the power to the switching mode power supply 8 and directs power to the air pump 7 as shown in FIG. 15. When a DC voltage is utilized in another embodiment of the present invention, the air pump 7 is directly powered as shown in FIG. 18. As a result, the aeration stone 3 aerates the body of water. The second position of the multi-position selector switch 13 stops power from flowing to both the air pump 7 and the switching mode power supply 8 as illustrated in FIG. 16. The second position of the multi-position selector switch 13, wherein the present invention is powered by a DC voltage is illustrated in FIG. 19. The second position is beneficial when the body of water containing the live bait is well aerated and is also at the proper temperature. In the preferred embodiment of the present invention, the temperature sensitive heating element 4 is based upon a temperature of 43 degrees Fahrenheit such that the body of water constantly remains at 43 degrees Fahrenheit. As illustrated in FIG. 17, the third position of the multi-position selector switch 13 directs power to both the switching mode power supply 8 and also the air pump 7. Therefore, when the multi-position selector switch 13 is in the third position, the body of water is aerated through the aeration stone 3 and is also heated through the temperature sensitive heating element 4 which is connected in series to the switching mode power supply 8. The third position of the multi-position selector switch 13, in the preferred embodiment and an alternative embodiment, is illustrated in FIG. 17 and FIG. 20 respectively. The third position is important when the temperature of the body of water drops below an acceptable level. More specifically, if the temperature in the body of water drops below 43 degrees Fahrenheit the temperature sensitive heating element 4 heats the body of water to 43 degrees Fahrenheit. In order to notify the user that the temperature sensitive heating element 4 is active the present invention comprises an indicator light 15. The indicator light 15 is electronically connected to the temperature sensitive heating element 4 as illustrated in FIGS. 15-20. In the preferred embodiment of the present invention, a light emitting diode has been utilized as the indicator light 15 which is externally mounted onto the submersed unit 1. However, in alternative embodiments of the present invention, the indicator light 15 can also be mounted onto the head unit housing 12 or any other functional position of the present invention.

The temperature sensitive heating element 4 provides heat to the body of water by converting electrical power into heat. In the preferred embodiment of the present invention, the heat is transferred from the temperature sensitive heating element 4 to the body of water by convection. In order to do so, the temperature sensitive heating element 4 comprises a thermistor 5 and a resistive wire 6. The thermistor 5 helps recognize the temperature of the body of water. In the preferred embodiment of the present invention, the thermistor 5 externally protrudes from the structural frame 2 as seen in FIG. 2 and FIG. 14. A circuit associated with the thermistor 5 directs the output from the thermistor 5 towards the resistive wire 6. In order to do so, the thermistor 5 is electrically connected to the resistive wire 6 as illustrated in FIGS. 15-20. The electrical connection with the thermistor 5 allows the resistive wire 6 to emit heat according to the current that is allowed to go through the resistive wire 6. For the temperature sensitive heating element 4 to function as required, the thermistor 5 and the resistive wire 6 are electrically connected to the switching-mode power supply 8 in series. Furthermore, the temperature sensitive heating element 4 includes an over temperature switch 200 and a temperature-control circuit switch 300 as illustrated in FIGS. 15-20. The temperature-control circuit switch 300 alternates between an on position and an off position in order to control the heat emitted by the resistive wire 6. In order to do so, the temperature-control circuit switch 300 is electrically connected in series to the resistive wire 6. More specifically, the position of the temperature-control circuit switch 300 is determined by the feedback provided by the thermistor 5. On the other hand, the over temperature switch 200 is utilized to prevent overheating of the present invention. The over temperature switch 200 is connected in parallel to the input power. If the temperature within the present invention raises above a recommended temperature the over temperature switch activates the short circuit fuse 17 protecting the present invention against high temperatures. As an example, if the internal temperature of the present invention raises above 200 degrees Fahrenheit the over temperature switch 200 activates the short circuit fuse 17, protecting the present invention against excessive heat.

Figure 4:
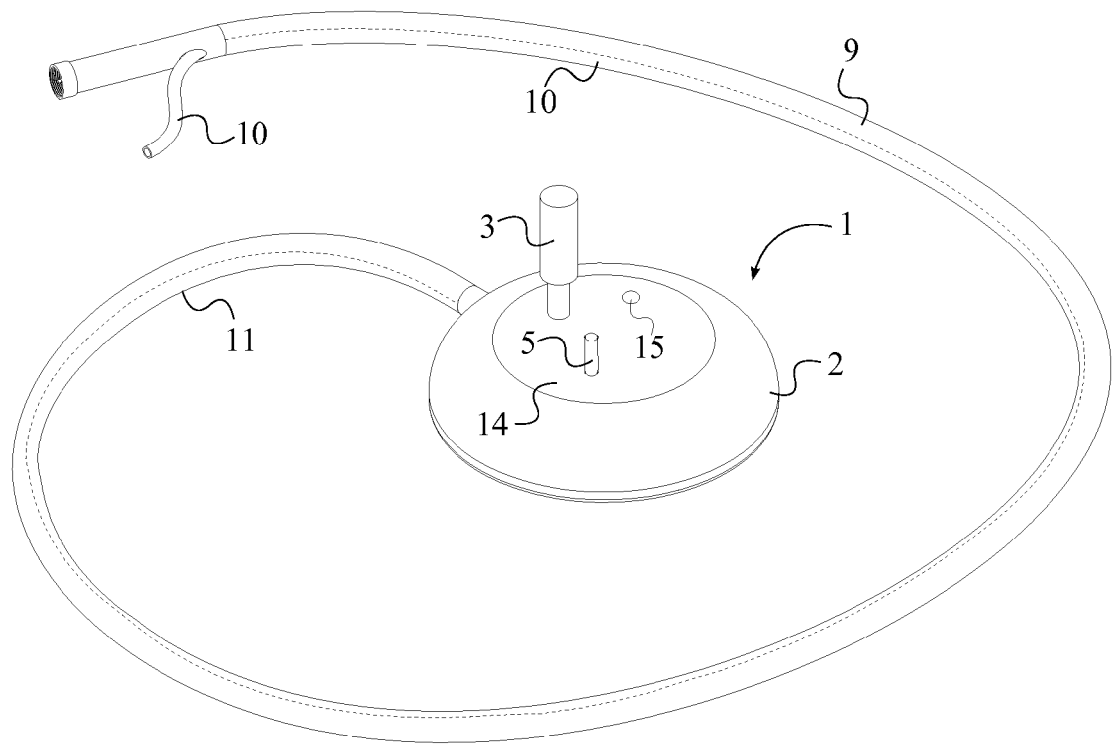
FIG. 4 is a perspective view of the submersed unit of the present invention.
Figure 5:
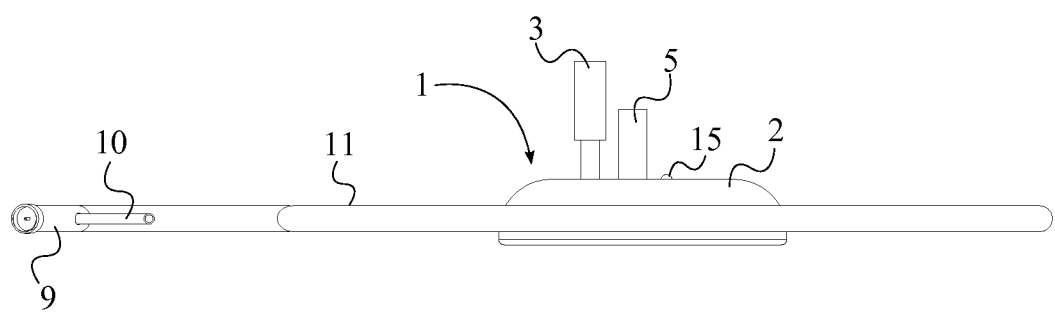
FIG. 5 is a side view of the submersed unit of the present invention.
Figure 6:
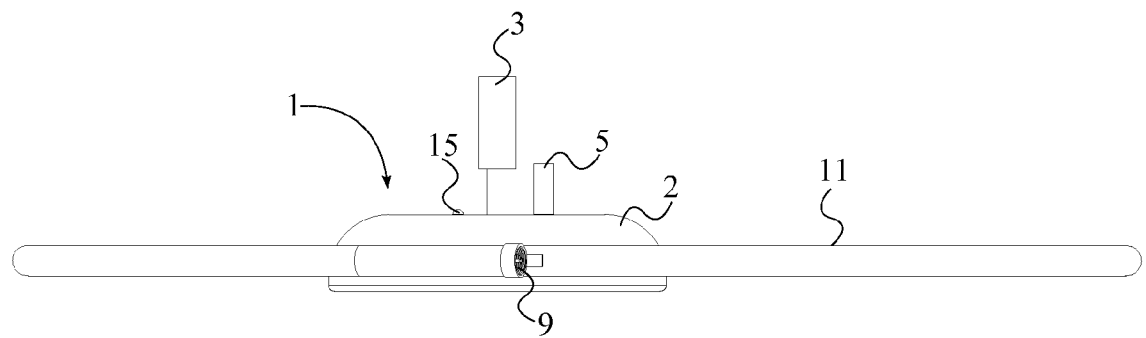
FIG. 6 is another side view of the submersed unit of the present invention.
Figure 7:
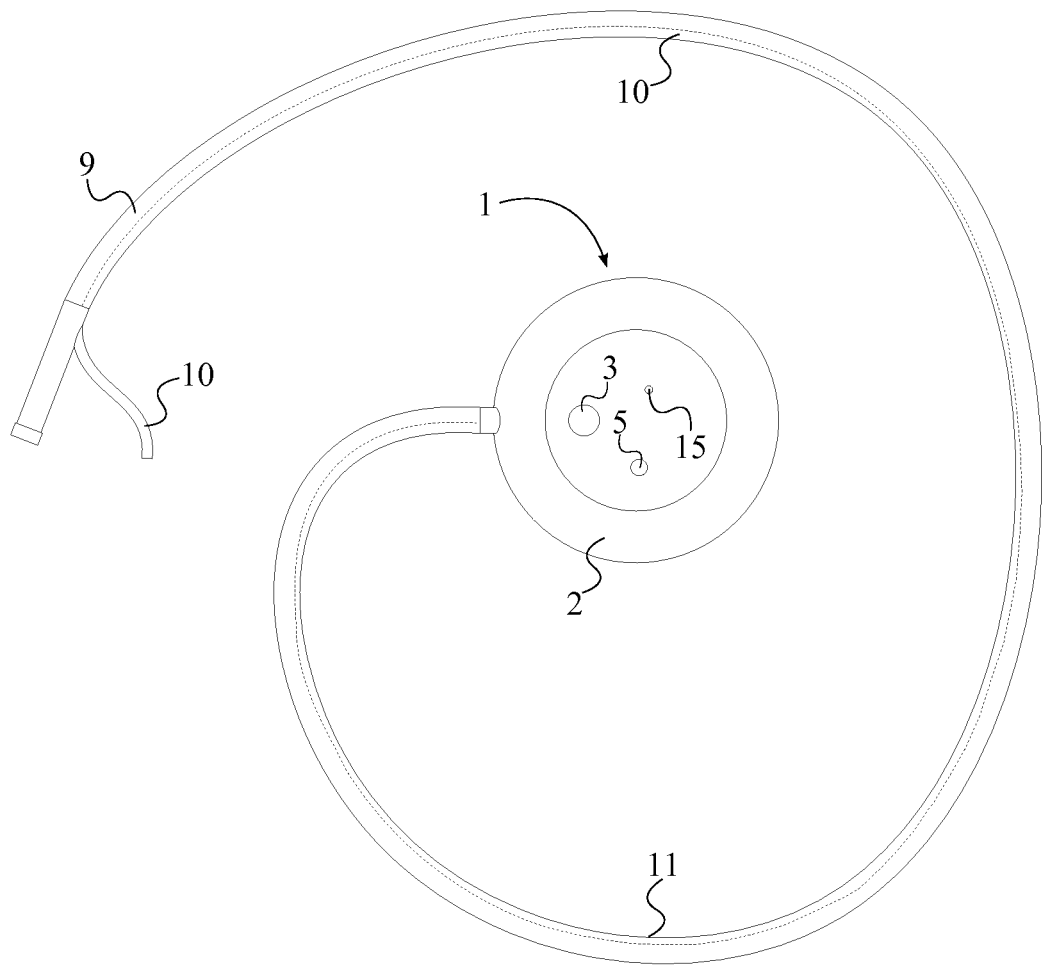
FIG. 7 is a top view of the submersed unit of the present invention.
Figure 8:
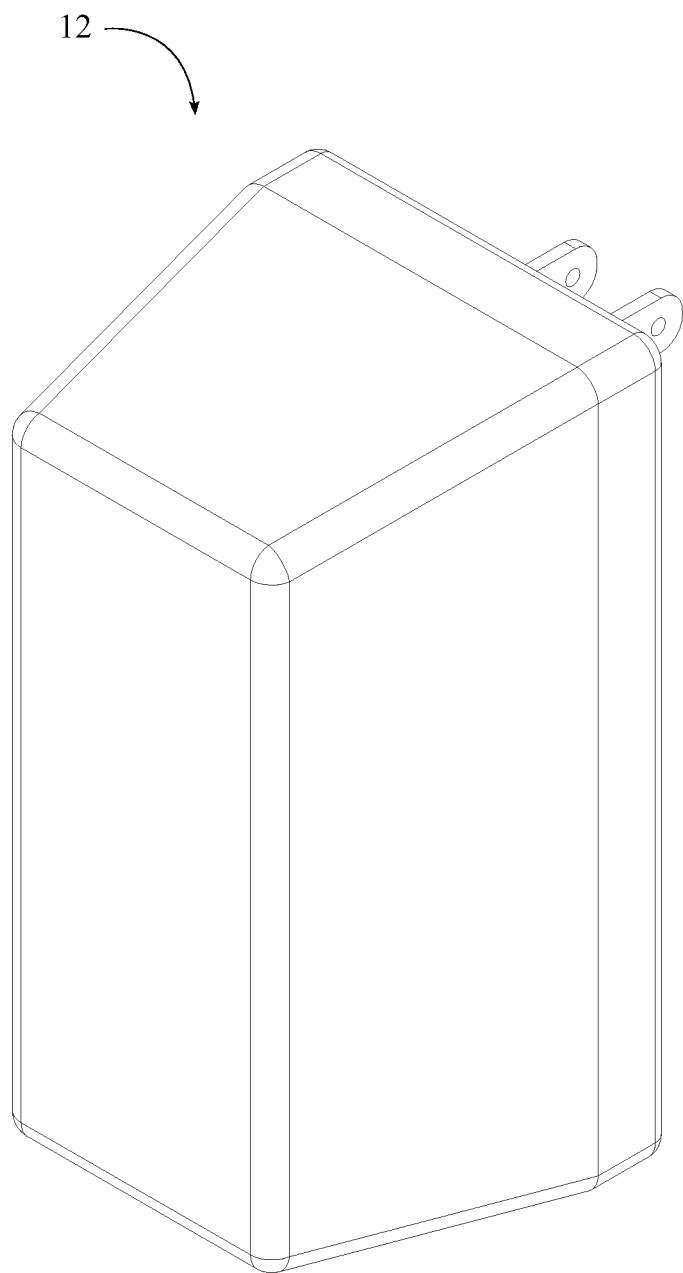
FIG. 8 is a perspective view of the head unit housing of the present invention.

Since the temperature sensitive heating element 4 is placed within the body of water, it is essential to ensure that no short circuit occurs when the present invention is in use. In order to do so, the present invention comprises a waterproof covering 14. The waterproof covering is illustrated in FIG. 4. More specifically, the resistive wire 6 is enclosed between the waterproof covering 14 and the structural frame 2. In the preferred embodiment of the present invention, the resistive wire 6 is potted in epoxy in order to provide the waterproof covering 14. Since the indicator light 15 is located on the submersed unit 1, the wiring connections of the indicator light 15 are also potted in epoxy. However, an alternative embodiment of the present invention the waterproof covering 14 can be different from epoxy. Similar to the submersed unit 1, the power transmission cable 9 also comes in contact with the body of water when in use. In order to prevent any short circuit, the present invention comprises a waterproof wire loom 11. The power transmission cable 9 and the air hose 10 are sleeved by the waterproof wire loom 11. In the preferred embodiment of the present invention, the power transmission cable 9 and the air hose 10 are positioned adjacent and along each other. However, in an alternative embodiment of the present invention, the power transmission cable 9 and the air hose 10 can be positioned separate from each other.

When utilizing the present invention, the following steps are followed. First, the submersed unit 1 is placed within the container that the live bait is stored in. Next, the head unit housing 12 is plugged into an external power outlet. The head unit housing 12 is plugged into an external power outlet in the preferred embodiment of the present invention. However, in an alternative embodiment wherein a DC power source is utilized, the air pump 7 and the temperature sensitive heating element 4 can be directly plugged into a car adapter or similar power source, without the head unit housing 12. In such instances, the present invention is powered with 12V DC power or 12V AC power, in contrast to being powered by 110V as in the preferred embodiment of the present invention. The multi-position selector switch 13 allows the user to control the living conditions of the live bait. If the live bait is within a recommended temperature range, the user can have the multi-position selector switch 13 in the first position in order to aerate the body of water. If the live bait is well aerated while being within the recommended temperature range, the multi-position selector switch 13 can be in the second position. If the live bait is below a certain recommended temperature, the multi-position selector switch 13 can be in the third position. As a result, the temperature sensitive heating element 4 emits heat according to the input signal received from the thermistor 5. The indicator light 15 also illuminates notifying that the temperature sensitive heating element 4 is active. Additionally, the present invention can also be designed such that the indicator light 15 is used to notify that the present invention is active. Resultantly, the body of water remains within a recommended temperature range which helps to keep the bait alive when dropped in the water.

Although the invention has been explained in relation to its preferred embodiment, it is to be understood that many other possible modifications and variations can be made without departing from the spirit and scope of the invention as hereinafter claimed.

What is claimed is:

1. An apparatus for aerating and heating the water in which live bait is held comprises:
   a submersed unit;
   an air pump;
   a switching-mode power supply;
   a power transmission cable;
   an air hose;
   a multi-position selector switch;
   the submersed unit comprises a structural frame, an aeration stone, and a temperature sensitive heating element;
   the aeration stone and the temperature sensitive heating element being mounted onto the structural frame;
   the switching-mode power supply being electronically connected to the temperature sensitive heating element through the power transmission cable;
   the air pump being in fluid communication with the aeration stone through the air hose;
   the multi-position selector switch being electrically connected to the air pump and the switching-mode power supply; and
   the switching-mode power supply being electrically connected in between the multi-position selector switch and the temperature-sensitive heating element.

2. The apparatus for aerating and heating the water in which live bait is held as claimed in claim 1 comprises:
   a waterproof wire loom;
   the power transmission cable and the air hose being sleeved by the waterproof wire loom; and
   the air hose being positioned adjacent and along the power transmission cable.

3. The apparatus for aerating and heating the water in which live bait is held as claimed in claim 1 comprises:
   a head unit housing;
   the head unit housing comprises an air intake hole;
   the air pump and the switching-mode power supply being positioned within the head unit housing; and
   the power transmission cable and the air hose traversing out of the head unit housing.

4. The apparatus for aerating and heating the water in which live bait is held as claimed in claim 3, wherein the air intake hole traverses through the head unit housing.

5. The apparatus for aerating and heating the water in which live bait is held as claimed in claim 1 comprises:
   the temperature-sensitive heating element comprises a thermistor and a resistive wire;
   the switching-mode power supply being electrically connected in series with the thermistor; and
   the thermistor being electrically connected in with the resistive wire.

6. The apparatus for aerating and heating the water in which live bait is held as claimed in claim 5, wherein the thermistor externally protrudes from the structural frame.

7. The apparatus for aerating and heating the water in which live bait is held as claimed in claim 6 comprises:
   a waterproof covering; and
   the resistive wire being enclosed between the waterproof covering and the structural frame.

8. The apparatus for aerating and heating the water in which live bait is held as claimed in claim 1 comprises:
   an overload fuse;
   a short circuit fuse;

the overload fuse being electrically connected to the multi-position selector switch; and the short circuit fuse being electrically connected in between the multi-position selector switch and the temperature-sensitive heating element.

9. The apparatus for aerating and heating the water in which live bait is held as claimed in claim 1 comprises:

an indicator light; and the indicator light being electronically connected to the temperature-sensitive heating element.

10. The apparatus for aerating and heating the water in which live bait is held as claimed in claim 9, wherein the indicator light is externally mounted onto the submersed unit.

11. The apparatus for aerating and heating the water in which live bait is held as claimed in claim 9, wherein the indicator light is externally mounted onto a head unit housing.

12. An apparatus for aerating and heating the water in which live bait is held comprises:

a submersed unit;

an air pump;

a switching-mode power supply;

a power transmission cable;

an air hose;

a multi-position selector switch;

an indicator light;

the submersed unit comprises a structural frame, an aeration stone, and a temperature sensitive heating element;

the aeration stone and the temperature sensitive heating element being mounted onto the structural frame;

the switching-mode power supply being electronically connected to the temperature sensitive heating element through the power transmission cable;

the air pump being in fluid communication with the aeration stone through the air hose;

the temperature-sensitive heating element comprises a thermistor and a resistive wire;

the thermistor being electrically connected with the resistive wire;

the switching-mode power supply being electronically connected to the air pump;

the switching-mode power supply being electrically connected in series with the thermistor;

the multi-position selector switch being electrically connected to the air pump and the switching-mode power supply;

the switching-mode power supply being electrically connected in between the multi-position selector switch and the temperature-sensitive heating element; and the indicator light being electronically connected to the temperature-sensitive heating element.

13. The apparatus for aerating and heating the water in which live bait is held as claimed in claim 12 comprises:

a waterproof wire loom;

the power transmission cable and the air hose being sleeved by the waterproof wire loom; and the air hose being positioned adjacent and along the power transmission cable.

14. The apparatus for aerating and heating the water in which live bait is held as claimed in claim 12 comprises:

a head unit housing;

the head unit housing comprises an air intake hole;

the air pump and the switching power supply being positioned within the head unit housing;

the power transmission cable and the air hose traversing out of the head unit housing; and the air intake hole traversing through the head unit housing.

15. The apparatus for aerating and heating the water in which live bait is held as claimed in claim 12 comprises:

a waterproof covering;

the thermistor being externally protruded from the structural frame; and the resistive wire being enclosed between the waterproof covering and the structural frame.

16. The apparatus for aerating and heating the water in which live bait is held as claimed in claim 12 comprises:

an overload fuse;

a short circuit fuse;

the overload fuse being electrically connected to the multi-position selector switch; and the short circuit fuse being electrically connected in between the multi-position selector switch and the temperature-sensitive heating element.

17. The apparatus for aerating and heating the water in which live bait is held as claimed in claim 12, wherein the indicator light is externally mounted onto the submersed unit.

18. The apparatus for aerating and heating the water in which live bait is held as claimed in claim 12, wherein the indicator light is externally mounted onto a head unit housing.

* * * * *